United States Patent [19]

Entrup et al.

[11] Patent Number: 5,318,375
[45] Date of Patent: Jun. 7, 1994

[54] LOCK FOR SECURING A COUPLING SLEEVE

[75] Inventors: Hubert G. Entrup; Mathias Konrad, both of Lohmar, Fed. Rep. of Germany

[73] Assignee: Jean Walterscheid GmbH, Lohmar, Fed. Rep. of Germany

[21] Appl. No.: 842,070

[22] Filed: Feb. 26, 1992

[30] Foreign Application Priority Data

Feb. 27, 1991 [DE] Fed. Rep. of Germany ....... 4106096

[51] Int. Cl.$^5$ .............................................. F16B 2/02
[52] U.S. Cl. ................................ 403/359; 403/322; 403/325; 403/344; 403/373; 411/366
[58] Field of Search ............. 403/359, 322, 324, 325, 403/327, 344, 9, 373; 411/366, 337, 424, 368, 354, 337, 383, 393; 464/182, 901

[56] References Cited

U.S. PATENT DOCUMENTS

| 880,415 | 2/1908 | Stevens | 411/366 X |
|---|---|---|---|
| 1,346,867 | 7/1920 | Weibull | 411/393 |
| 1,372,708 | 3/1921 | Lovington | 411/21 |
| 2,278,698 | 4/1942 | Green | 464/182 |
| 2,448,278 | 8/1948 | Ronning | 403/359 |
| 2,885,231 | 5/1959 | Smith | 403/327 |
| 2,910,842 | 11/1959 | Sensenig | 464/182 |
| 4,645,368 | 2/1987 | Simpson et al. | 403/9 |
| 4,824,274 | 4/1989 | von Haas | 403/322 X |

FOREIGN PATENT DOCUMENTS

| 201950 | 2/1959 | Austria | 411/368 |
|---|---|---|---|
| 339380 | 11/1989 | European Pat. Off. | 403/359 |
| 8391I163k | 2/1956 | Fed. Rep. of Germany | 403/359 |
| 1220675 | 7/1966 | Fed. Rep. of Germany . | |
| 2737492 | 2/1978 | Fed. Rep. of Germany | 403/324 |
| 3340130 | 3/1985 | Fed. Rep. of Germany . | |
| 568822 | 11/1957 | Italy | 403/359 |
| 649893 | 2/1979 | U.S.S.R. | 411/337 |
| 12207 | of 1906 | United Kingdom | 411/366 |
| 1100040 | 1/1968 | United Kingdom | 403/359 |
| 2140515 | 11/1984 | United Kingdom | 403/405 |

Primary Examiner—Randolph A. Reese
Assistant Examiner—Harry C. Kim
Attorney, Agent, or Firm—Harness, Dickey & Pierce

[57] ABSTRACT

A lock 7 non-rotatingly and axially secures a coupling sleeve 6 to a power take off shaft 4 or driving journal 5 of a self driving implement or tractor 1. To achieve a clearance free rotatable and axial connection between the coupling sleeve 6 and power take off shaft 4 or driving journal 5, the locking element via at least one locking face 15, at least partially engages an annular groove 12 of the power take off shaft 4 or driving journal 5 to provide a clearance free connection. The locking element may be a bolt 16 with a conical locking face 15 to engage the angular groove 12.

18 Claims, 5 Drawing Sheets

LOCK FOR SECURING A COUPLING SLEEVE

BACKGROUND OF THE INVENTION

The invention relates to a lock for non-rotatingly and axially securing a coupling sleeve of a power take off shaft, especially of a self driving implement, e.g. a tractor.

The coupling sleeves include a bore with multiple splines and the power take off shaft has a corresponding multiple spline profile with a continuous annular groove. The coupling sleeve has a second bore to receive a locking element. The second bore is arranged at right angles relative to the longitudinal axis of the first bore. The second bore intersects the annular groove and with the locking element provided in the second bore, the locking element engages the annular groove via at least one locking face. This locking establishes a non-releasable connection between the power take off shaft and the coupling sleeve.

It is known to secure coupling sleeves and power take off shafts via locking elements in the form of balls which are guided in radial apertures of the coupling sleeve. These balls are secured radially by a locking ring and enter the locking position by engaging an annular groove extending transversely relative to the power take off shaft axis. Such locks are intended to be used as high speed locks, which is why they are provided with play in both the axial and the torque transmitting directions. If such locks are implemented in a connection subject to vibration in the direction of rotation and/or in the axial direction, deflection of the toothed profile or the locking elements may result.

DE 3340130 C1 proposes an embodiment comprising a pivotable locking ring and a locking bolt. The locking bolt presses against a wedge additionally provided in the coupling sleeve. The wedge is intended to balance the play, in the circumferential direction between the teeth of the coupling sleeve and those of the wheel shaft U.S. Pat. No. 4,645,368 discloses a high speed locking mechanism consisting of a locking pin engaged in a bore, transversely positioned relative to the power take off shaft axis. The bore is positioned at a desired radial distance and is at the level of the annular groove. The locking pin is spring loaded and guided in the bore. The locking pin projects from a radially stepped end of the bore, the locking pin projects from this bore so that it may be displaced inwardly from the outside by applying force against the force of the spring. The locking pin engages the shaft annular groove via a thickened portion and connects the coupling sleeve with the power take off shaft. The pin is released by pushing in the locking pin.

Both of the above designs of a shaft and sleeve connection are intended for high speed assembly and have play in both the axial and torque transmitting directions. In the case of the latter design, the force locking connection is achieved exclusively through the force of the spring.

SUMMARY OF THE INVENTION

It is an object of the present invention to provide a lock which ensures an axial and non-rotating connection between the coupling sleeve and the power take off shaft. The locking is accomplished through a clearance free arresting means which is supported so that it cannot be lost or misplaced.

In accordance with the invention, the objective is achieved by a locking element designed as a bolt positioned inside a through bore of the coupling sleeve. A locking face of the locking element either directly or through connecting parts comprising the locking faces to one another.

When the locking element is threaded in the bore, its locking face is supported directly in the shaft annular groove so that the power take off shaft is connected to the coupling sleeve in a force locking way, via the locking face of the locking element. At the same time, a non rotating, clearance free connection is obtained as a result of the tension generated in the annular groove. Also, by radially displacing the coupling sleeve relative to the power take off shaft it is possible to achieve clearance free axial tensioning. As a result of the radial displacement of the coupling sleeve, the power take off shaft, with its multi spline profile, is pressed into multiple splines of the coupling sleeve bore positioned opposite the second bore. In consequence, the connection is clearance free in both directions of rotation. The reason why this is achieved is that the shape of the multiple splines is such that only the flanks participate in the transmission of torque.

According to a further embodiment of the invention, the locking element constitutes a two part threaded pin with mirror symmetrically opposed calotte ends. One end is designed as a threaded pin head and the other end as a nut. The two parts are threaded to one another in the bore and engage the shaft annular groove, via their calotte contours designed as a locking face. The nut is non-rotatingly held.

In another embodiment, the locking element is a two part threaded pin having a calotte shaped pin head and nut. The two parts, with their calotte contours, are designed as the locking face to engage the shaft annular groove. When the threaded pin connection is tightened, a force locking connection is produced between the coupling sleeve and the power take off shaft. The advantage of this embodiment is that the locking elements are supported in the bore of the coupling sleeve in such a way that they cannot be lost. The locking element is locked and released simply by tightening or unfastening the threaded connection.

In a further embodiment of the invention, the locking element includes two mirror symmetric calotte halves with through bores threaded together, via a threaded pin and a nut, at a desired distance from one another in the coupling sleeve bore. The calotte contour locking face engages the shaft annular groove in the bore. This slightly modified embodiment of the locking element again represents a cost effective design for achieving a shaft and coupling sleeve connection.

In order to prevent the threads from being subjected to loads while the connection is unfastened, the locking element consists of a two part threaded pin. The pin head has an external thread and an internal hexagonal opening. The threaded pin extension has a cylindrical guiding portion and a conical, tapered or spherical portion which engages the annular groove. The coupling sleeve bore is designed to be partially threaded and partially radially stepped.

In a further embodiment of the invention, the head of the threaded pin, via its inwardly pointing end face, rests against a spherical end face of the threaded pin extension. The two part design of the threaded pin with its planar end face at the pin head and a spherical end face at the pin extension ensures a point contact between the two parts so that under load, only a small moment is transmitted from the locking element to the threaded plug.

In order to facilitate the return of the threaded pin extension, the head and the threaded pin extension are rotatably connected to one another. Preferably, the two parts are riveted one to the other to achieve a rotatable connection between the head and threaded pin extension. According to a further embodiment of the locking element, the head and threaded pin extension are supported relative to one another via a spring. Supporting the head relative to the threaded pin extension, via the spring, ensures that in the case of wear of the locking elements or settlement of the parts at the power take off shaft or driving journal, there occurs a uniform tangential force. By using a tapered threaded plug, unfastening of the threaded connection is facilitated.

From the following detailed description taken in conjunction with the accompanying drawings and subjoined claims, other objects and advantages of the present invention will become apparent to those skilled in the art.

BRIEF DESCRIPTION OF THE DRAWINGS

The invention will be explained with reference to several embodiments illustrated in the drawing wherein.

DETAILED DESCRIPTION OF THE PREFERRED EMBODIMENTS

Figure 1:
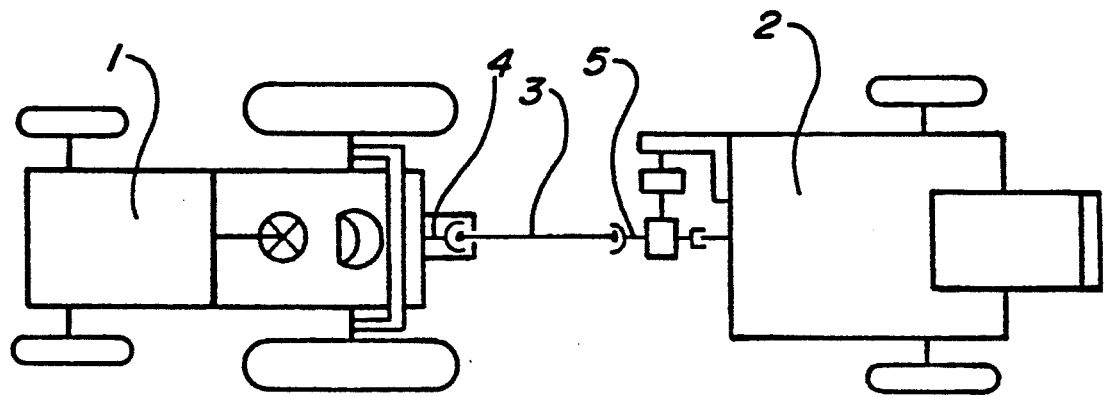
FIG. 1 is a schematic view of a tractor with an attached implement driven via a driveshaft.

FIG. 1 shows a tractor 1 with an attached implement 2 driven by the tractor 1. The implement 2 is driven by a propeller shaft 3. One end of the shaft 3 is plugged onto the power take off shaft 4 and the other onto the driving journal 5 of the implement 2. A coupling sleeve 6 connects the driveshaft to the power take off shaft 4 and/or the driving journal 5. A lock 7, as described in greater detail herein, connects the shaft with the coupling sleeve.

Figure 2:
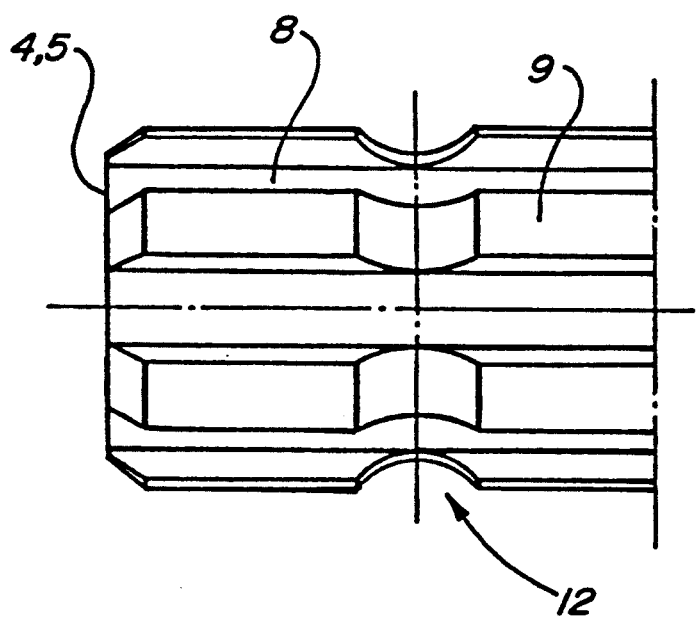
FIG. 2 is a side elevation view of a drive shaft in accordance with the present invention.

In FIGS. 3 through 7, locks 7 are shown in the locking position. The power take off shaft 4 and driving journal 5 have a multiple spline profile 8 with several circumferentially distributed teeth 9 as seen in FIG. 2. The coupling sleeve 6 is provided with multiple splines bore 10 having recesses 11 corresponding in shape and number to the teeth 9 of the power take off shaft 4. The power take off shaft 4 or driving journal 5, at a distance from its projecting end, includes a recess in the shape of an annular groove 12 which circumferentially extends around the power take off or driving journal 5 and is cut into the teeth 9. If viewed in cross section, the recess constitutes a circular arch.

The coupling sleeve 6 has a second bore 13, which may be stepped, intended to receive the lock 7. The bore 13 is arranged at a right angle relative to the longitudinal axis of bore 10 and the power take off shaft 4. The arrangement of its wall 14 corresponds to the radial distance from the annular groove 12. The locking face 15 of the lock 7 engages the annular groove 12 and produces a force locking connection between the coupling sleeve 6 and the power take off shaft 4 or driving journal 5, respectively. The locking element 7 itself has different designs as shown in FIGS. 3 through 7 and will be described in greater detail below.

Figure 3:
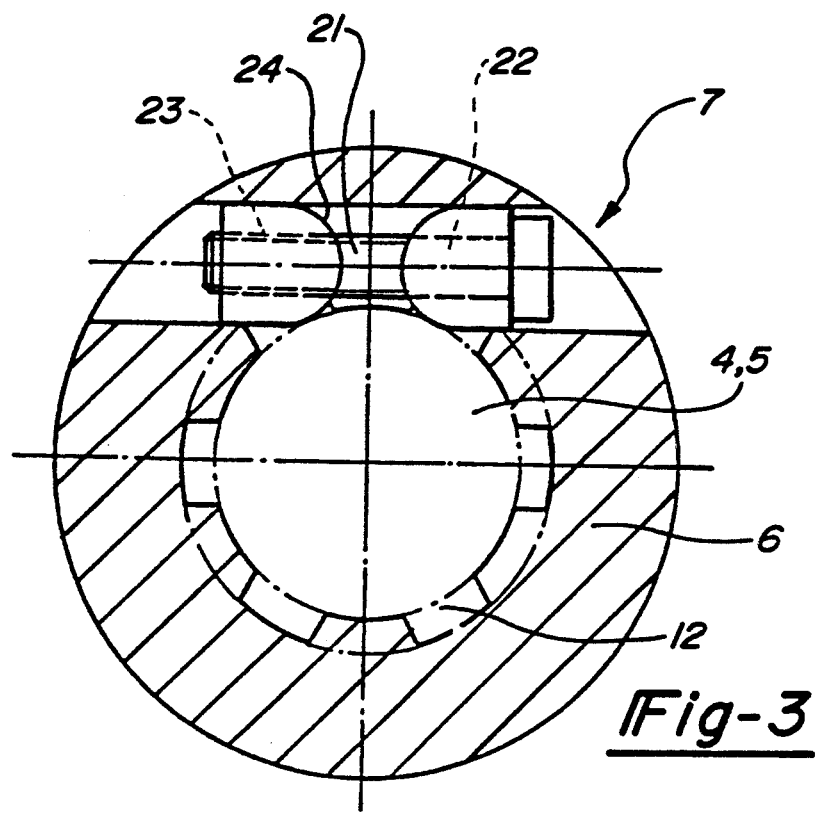
FIG. 3 is a longitudinal section view of a second embodiment of a lock having a calotte shaped threaded pin head and nut.

FIG. 3 shows a further embodiment of the lock 7. A threaded pin 21 with an allen type head has at one end a calotte shaped internally threaded pin head 22 abutting the allen head, and a calotte shaped nut 23 at the other end. The calotte shaped pin head and nut are arranged opposite one another in a mirror symmetrical way. The head and nut engage the annular groove 12 with their calotte shaped contour 24 to establish a force locking connection between the coupling sleeve 6 and the power take off shaft 4 or driving journal 5.

Figure 4:
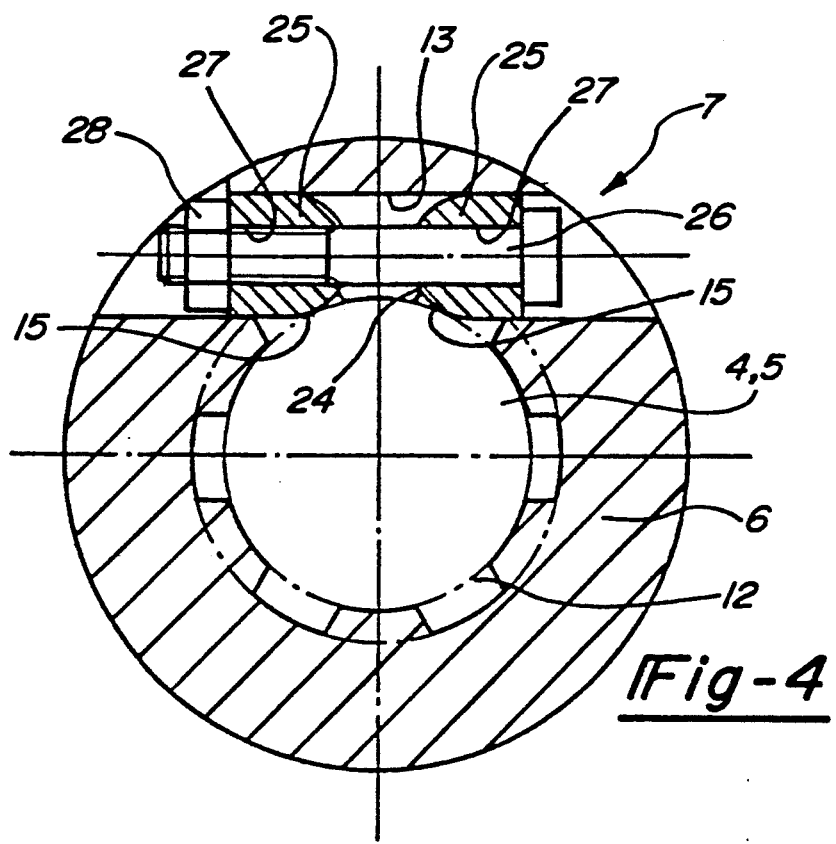
FIG. 4 is a longitudinal section view of another embodiment of the lock having a threaded pin, a nut and two calotte halves.

Alternatively, it is possible for two mirror symmetrically arranged calotte halves 25, according to FIG. 4, to include a through bore 27 and be threaded on to a threaded pin 25 and be secured by a nut 28. In FIGS. 3 and 4 the coupling sleeve 6 is shown to have a cylindrical cross section.

Figure 5:
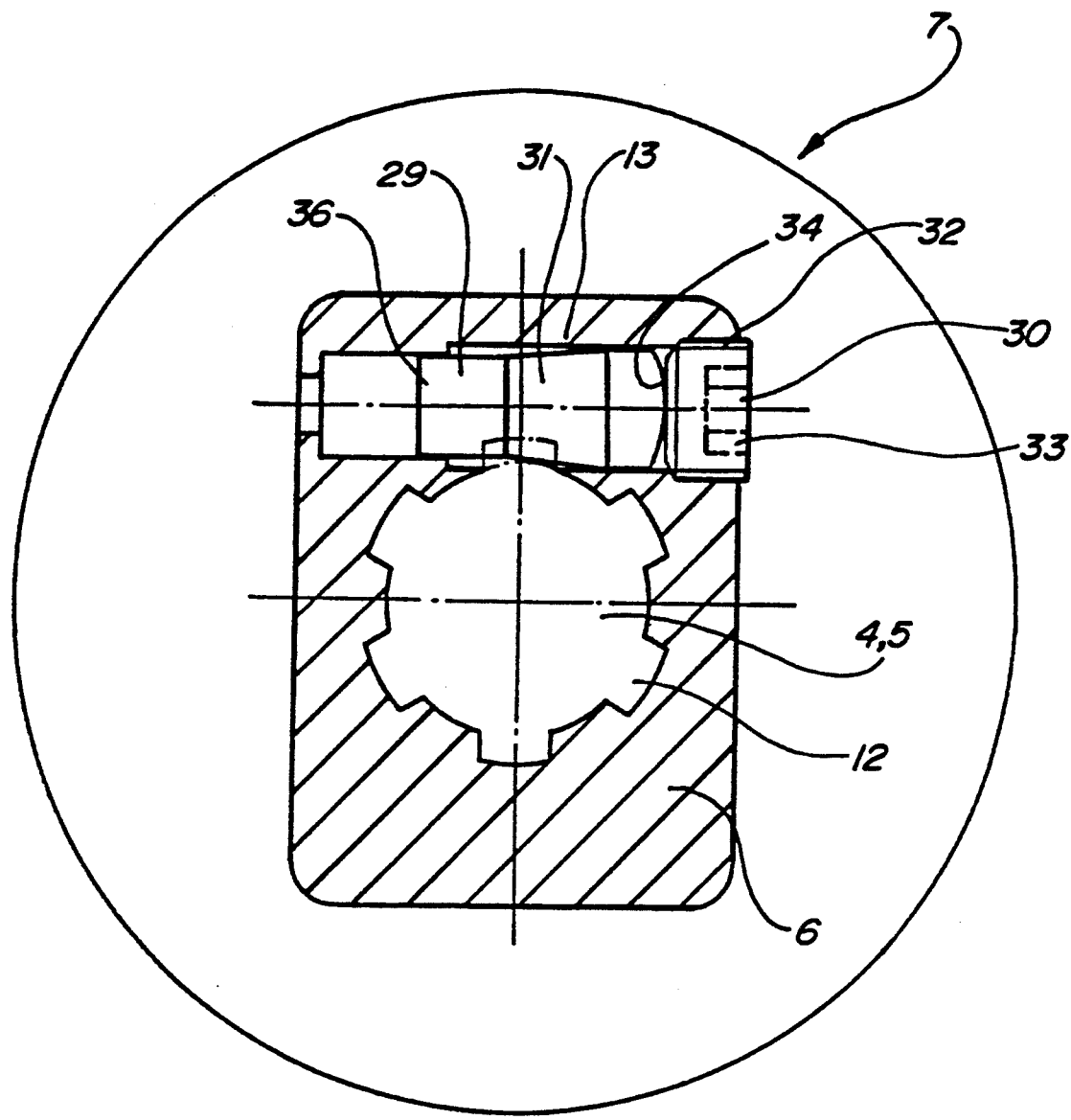
FIG. 5 is a longitudinal section view of an embodiment having a two part threaded pin.

FIG. 5 shows a two part threaded pin 29 having a head 30 and a threaded pin extension 31 which are in single point contact. The head 30 has an outer thread 32 and an inner hexagon opening 33. The inwardly pointing end face 34 of the head 30 rests against a spherical end face 35 of the threaded pin extension 31. The threaded pin connection 31 includes a guiding portion 36 and a tapered or conical portion 20. The tapered portion 20, for locking purposes, engages the annular groove 12 of the power take off shaft 4 or the driving journal 5. A clearance free connection between the coupling sleeve 6 and the power take off shaft 4 is achieved by threading the head 30 into the bore 13 of the coupling sleeve 6. Via the point contact on the spherical end face 35, the threaded pin extension 31 is pressed into the annular groove 12 for establishing a force locking connection. For the purpose of threading the head 30 into the sleeve, the sleeve bore 13 is partially threaded whereas the opposite end of the bore 13 may include several radial steps. For unfastening the connection between the coupling sleeve 6 and the power take off shaft 4 or driving journal 5, the head 30 is screwed out of the threaded portion of the bore 13, the threaded pin extension 31 is pushed out.

Figure 6:
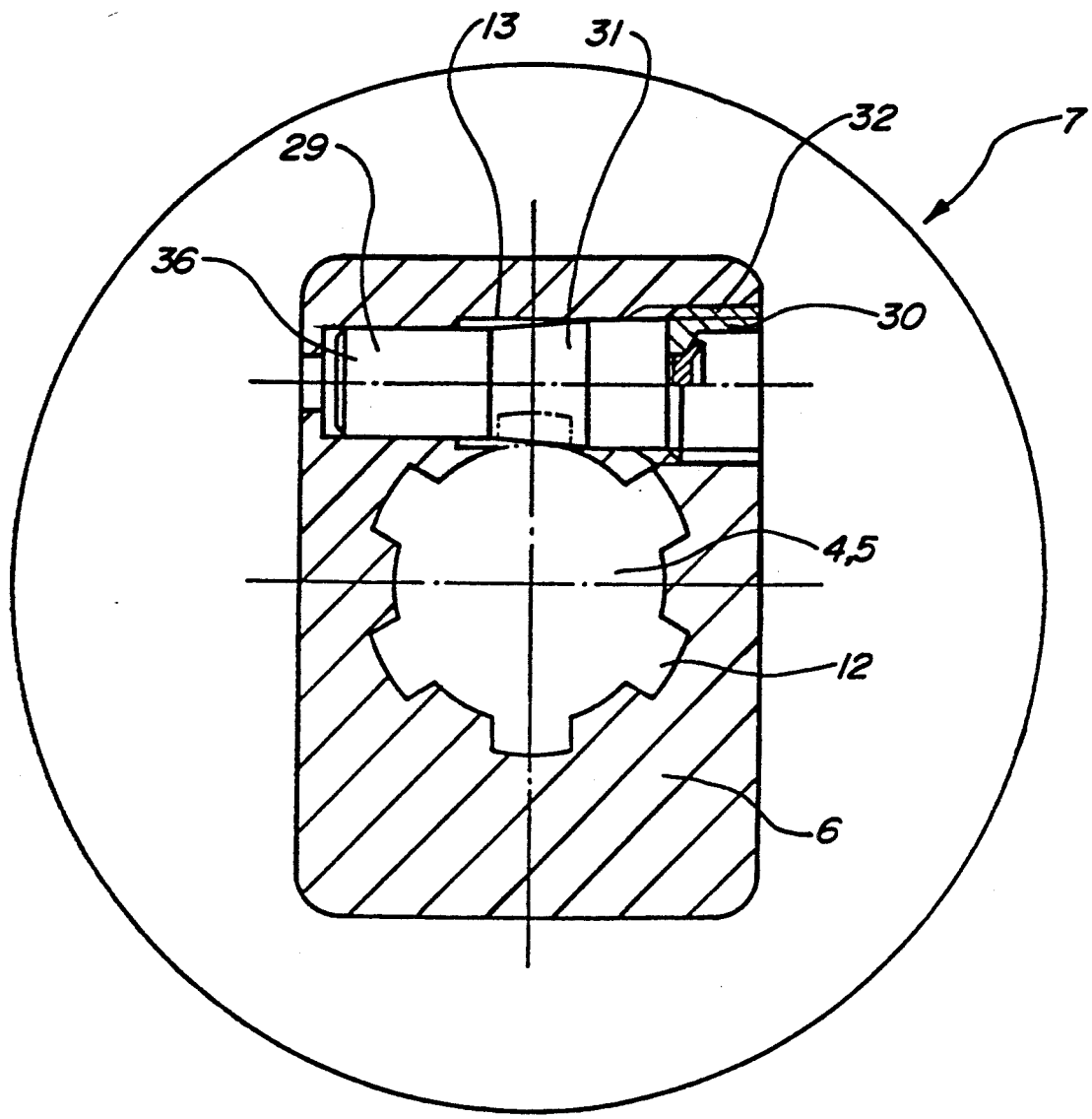
FIG. 6 is a longitudinal section view like FIG. 5, having a two part threaded pin, with the two parts rotatably connected to one another.
Figure 7:
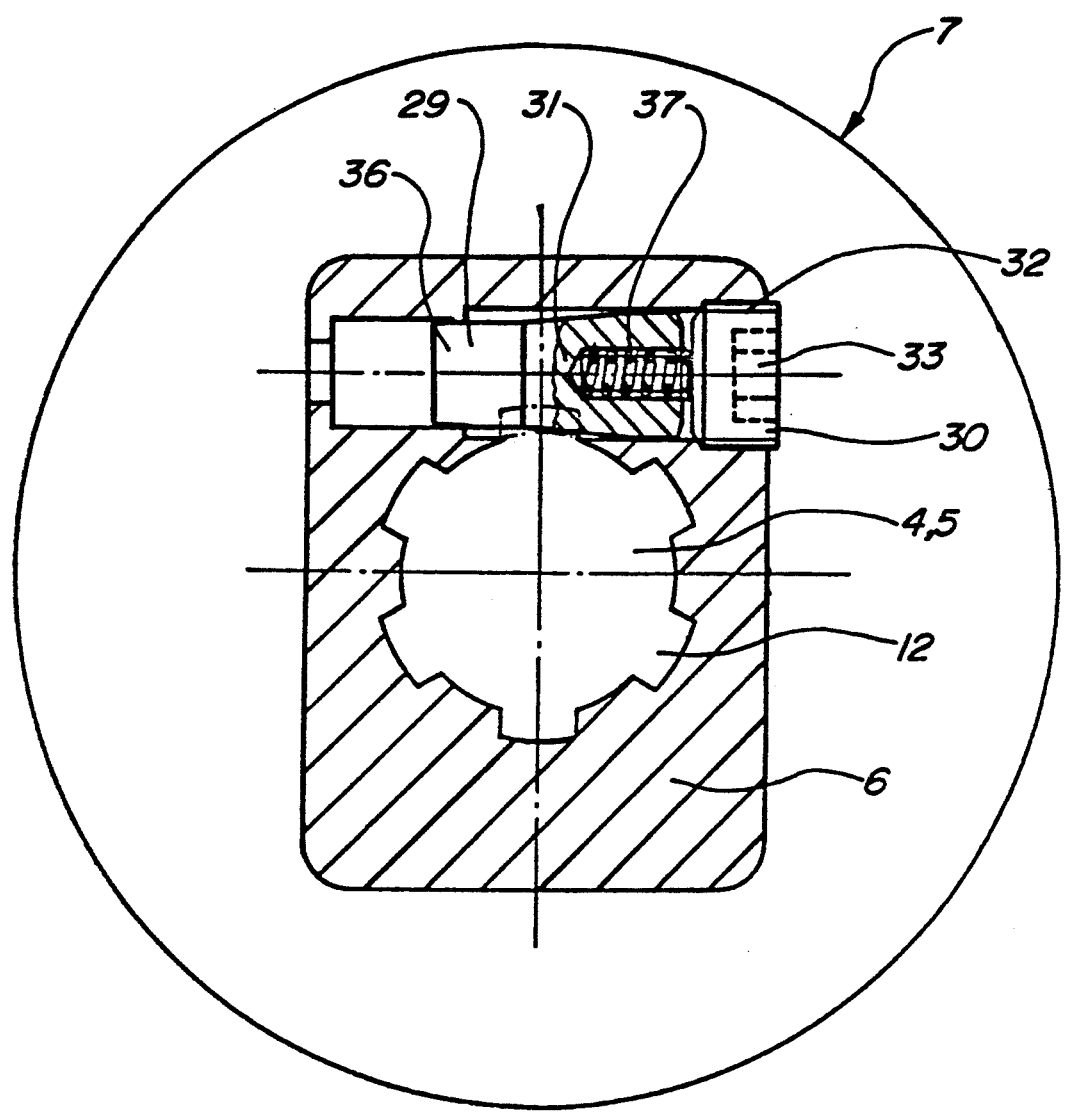
FIG. 7 is a longitudinal section view like FIG. 5, having a two part threaded pin supported via a spring.

In FIG. 6, the head 30 and the threaded pin extension 31 of the threaded pin 29 are rotatably connected to one another by riveting. In FIG. 7, the threaded pin extension 31 and the head 30 are also separate parts, with the threaded pin extension 31 being supported via a spring 37 relative to the head 30. This design ensures that even if the lock suffers from wear or in the case of settlement of the parts at the power take off shaft 4 and/or driving journal 5, a uniform tangential force occurs. The locking element is fastened and unfastened as described in connection with FIG. 5.

We claim:

1. A coupling sleeve and a lock for non-rotatingly and axially securing the coupling sleeve comprising:
    a coupling sleeve having a first bore with multiple spines adapted for receiving a power take off shaft with a corresponding multiple spline profile and a continuous annular groove, said coupling sleeve having a second through bore for receiving a locking element, said second bore arranged at a right angle relative to a longitudinal axis of the first bore and is adapted to intersect the shaft annular groove;

a locking element designed as a bolt positioned inside said second bore of the coupling sleeve, said locking element adapted to engage the shaft annular groove via at least one locking face having a conical, tapered or spherical portion to establish a non-releasable connection between the shaft and the coupling sleeve for prohibiting axial and circumferential play of said shaft, said locking element includes a two part threaded pin with a head having an external thread and an internal opening and a pin extension with a cylindrical guiding portion and said conically tapered or spherical portion which is adapted to engage the shaft annular groove and said second bore being partially threaded and partially radially stepped, said head fixably positioning said pin extension in said second bore such that said locking element is prohibited from movement.

2. A coupling sleeve and lock according to claim 1, wherein said threaded head of the pin, via its inwardly pointing end face, rests against a spherical end face of the pin extension.

3. A coupling sleeve and lock according to claim 1, wherein said threaded head and pin extension are rotatably connected to one another.

4. A coupling sleeve and lock according to claim 1, wherein said threaded head and pin extension are riveted to one another.

5. A coupling sleeve and lock according to claim 1, wherein said threaded head and pin extension are supported relative to one another via a spring.

6. A coupling sleeve and lock according to claim 5, wherein said spring is guided in a tapered threaded extension.

7. A lock for non-rotatingly and axially securing a coupling sleeve comprising:

a locking element designed as a bolt adapted to be positioned inside of a second bore at a right angle to a central bore of the coupling sleeve, said locking member adapted to engage a shaft annular groove via at least one locking face to establish a non-releasable connection between a shaft and the coupling sleeve for prohibiting axial and circumferential play of said shaft, said locking element includes a two part threaded pin with a head having an external thread and an internal opening and a pin extension with a cylindrical guiding portion and said conically tapered or spherical portion which is adapted to engage the shaft annular groove and said second bore being partially threaded and partially radially stepped, said head threadedly fixed into the second bore for fixably positioning said locking element in said second bore.

8. A lock according to claim 7, wherein said threaded head of the pin, via its inwardly pointing end face, rests against a sperical end face of the pin extension.

9. A lock according to claim 7, wherein said threaded head and pin extension are rotatably connected to one another.

10. A lock according to claim 7, wherein said threaded head and pin extension are riveted to one another.

11. A lock according to claim 7, wherein said threaded head and pin extension are supported relative to one another via a spring.

12. A lock according to claim 11, wherein said spring is guided in a tapered threaded extension.

13. A coupling sleeve and a lock for non-rotatingly and axially securing the coupling sleeve comprising:

a coupling sleeve having a first bore with multiple splines adapted for receiving a power take off shaft with a corresponding multiple spline profile and a continuous annular groove, said coupling sleeve having a second through bore for receiving a locking element, said second bore arranged at a right angle relative to a longitudinal axis of the first bore and is adapted to intersect the shaft annular groove;

a locking element designed as a bolt positioned inside said second bore of the coupling sleeve, said locking member including two mirror symmetric calotte halves adapted to engage the shaft annular groove, said calotte halves positioned in said second bore and including locking face calotte contours engaging said shaft annular groove and means for fixably positioning said locking element in said second bore.

14. A coupling sleeve and lock according to claim 13, wherein said locking element includes a two part threaded pin with said mirror symmetrically opposed calotte ends, one end being a threaded pin head and the other end a non-rotating nut, said two parts are threaded to one another and engage the annular groove, via said locking face calotte contours, while being positioned in the second bore.

15. A coupling sleeve and lock according to claim 13, wherein said two mirror symmetric calotte halves have through bores and are positioned a distance from one another, said two halves are threaded together in the second bore via a threaded pin and a nut and, via the locking face calotte contour, are adapted to engage the shaft annular groove.

16. A lock for non-rotatingly and axially securing a coupling sleeve comprising:

a locking element designed as a bolt adapted to be positioned inside of a second bore at a right angle to a central bore of the coupling sleeve, said locking member including two mirror symmetric calotte halves adapted to engage a shaft annular groove, said calotte halves positioned in said second bore and including locking face calotte contours engaging said shaft annular groove and means for fixably positioning said locking element in said second bore.

17. A lock according to claim 16, wherein said locking element includes a two part threaded pin with said mirror symmetrically opposed calotte ends, one end being a threaded pin head and the other end a non-rotating nut, said two parts are threaded to one another and engage the annular groove, via said locking face calotte contours, while being positioned in the second bore.

18. A lock according to claim 16, wherein said two mirror symmetric calotte halves have through bores and are positioned a distance from one another, said two halves are threaded together in the second bore via a threaded pin and a nut and, via the locking face calotte contour, are adapted to engage the shaft annular groove.

* * * * *